(12) United States Patent
Coomer et al.

(10) Patent No.: US 8,431,019 B2
(45) Date of Patent: Apr. 30, 2013

(54) WASTEWATER TREATMENT SYSTEM

(75) Inventors: Jeff Coomer, Union, OH (US); David Clinkscales, Dayton, OH (US); Jeff Luthman, Moraine, OH (US)

(73) Assignee: Consolidated Treatment Systems, Inc., Franklin, OH (US)

( * ) Notice: Subject to any disclaimer, the term of this patent is extended or adjusted under 35 U.S.C. 154(b) by 445 days.

(21) Appl. No.: 12/781,492

(22) Filed: May 17, 2010

(65) Prior Publication Data

US 2010/0288683 A1 Nov. 18, 2010

Related U.S. Application Data

(60) Provisional application No. 61/178,612, filed on May 15, 2009.

(51) Int. Cl.
*C02F 3/00* (2006.01)
(52) U.S. Cl.
USPC ........... 210/150; 210/151; 210/220; 210/513; 210/532.1; 210/540
(58) Field of Classification Search .......... 210/150–151, 210/220, 513, 532.1, 540
See application file for complete search history.

(56) References Cited

U.S. PATENT DOCUMENTS

| | | | |
|---|---|---|---|
| 3,923,656 A | 12/1975 | Krebs et al. | |
| 4,246,114 A | 1/1981 | Krebs et al. | |
| 5,441,634 A * | 8/1995 | Edwards | 210/194 |
| 5,785,854 A | 7/1998 | McKinney | |
| 6,358,411 B1 | 3/2002 | McKinney | |
| 7,077,952 B2 | 7/2006 | Burks | |

* cited by examiner

*Primary Examiner* — Chester Barry
(74) *Attorney, Agent, or Firm* — Porter, Wright, Morris & Arthur, LLP (57) ABSTRACT

A wastewater treatment system includes an outer tank, an aeration chamber partition located within the outer tank and forming an aeration chamber, and a draft tube located within the outer tank and vertically extending into the bottom of the aeration chamber to communicate the aeration chamber with an outer chamber formed. A submerged aerator is located within the draft tube. An inlet communicates influent into the aeration chamber and an outlet communicates effluent out of the outer tank. A scum baffle prevents floating solids from entering the outlet. The outer tank has an effluent weir which supports the scum baffle and the scum baffle has an upward facing flange that supports the aeration chamber partition. An air intake pipe extending to the aerator through an upper end of the draft tube has support members engaging a top of the draft tube to support the aerator within the draft tube.

19 Claims, 6 Drawing Sheets

WASTEWATER TREATMENT SYSTEM

CROSS-REFERENCE TO RELATED APPLICATIONS

The application claims the priority benefit of U.S. Provisional Application No. 61/178,612 filed on May 15, 2009, the disclosure of which is expressly incorporated herein in its entirety by reference.

STATEMENT REGARDING FEDERALLY SPONSORED RESEARCH

Not Applicable

REFERENCE TO APPENDIX

Not Applicable

FIELD OF THE INVENTION

The field of the present invention generally relates to domestic sewage treatment systems and, more particularly, to aerobic waste treatment systems.

BACKGROUND OF THE INVENTION

One type of sewage treatment system operates using an aerobic bacterial process that breaks down waste materials into carbon dioxide and water. This aerobic treatment system has distinct advantages over the much more common anaerobic septic systems. The aerobic process is much faster and its products are less objectionable with regard to odor and flammability. U.S. Pat. Nos. 3,923,656 and 4,246,114, the disclosures of which are expressly incorporated herein in their entireties by reference, each disclose an aerobic waste treatment facility or system in which waste (often referred to as "wastewater") is treated under aerobic conditions to transform the waste to an essentially clear effluent.

Despite the advantages of aerobic sewage treatment systems, the majority of residences still rely on septic systems. In addition to the fact that a septic system may be easier and less expensive to install, the apparent preference for septic systems may also be to some extent on the necessity to provide proper maintenance. Accordingly, there is a need in the art for improved aerobic waste treatment systems.

SUMMARY OF THE INVENTION

The present invention provides an aerobic wastewater treatment system that overcomes at least some of the issues of the related art. Disclosed is an aerobic wastewater treatment system comprises, in combination, an outer tank, an aeration chamber partition located within the outer tank and forming an aeration chamber therein, a draft tube located within the outer tank and vertically extending into the bottom of the aeration chamber to communicate the aeration chamber with an outer chamber formed between the aeration chamber partition and the outer tank, an aerator located within the draft tube, an inlet for communicating influent into the aeration chamber, an outlet for communicating effluent out of the outer tank, and a scum baffle for preventing floating solids from exiting the outlet.

Also disclosed is an aerobic wastewater treatment system comprising, in combination, an outer tank, an aeration chamber partition located within the outer tank and forming an aeration chamber therein, a draft tube located within the outer tank and vertically extending into the bottom of the aeration chamber to communicate the aeration chamber with an outer chamber formed between the aeration chamber partition and the outer tank, an aerator located within the draft tube, an inlet for communicating influent into the aeration chamber, an outlet for communicating effluent out of the outer tank. The aerator is supported on the draft tube. Preferably, the aerator is unsecured to the draft tube so that the aerator can be raised out of the system without pumping the system.

Further disclosed is an aerobic wastewater treatment system comprising, in combination, an outer tank, an aeration chamber partition located within the outer tank and forming an aeration chamber therein, a draft tube located within the outer tank and vertically extending into the bottom of the aeration chamber to communicate the aeration chamber with an outer chamber formed between the aeration chamber partition and the outer tank, an aerator located within the draft tube, an inlet for communicating influent into the aeration chamber, an outlet for communicating effluent out of the outer tank, and a scum baffle for preventing floating solids from entering the outlet. The outer tank has an effluent weir and the scum baffle is supported on the effluent weir. The scum baffle has an upward facing flange and the aeration chamber partition is supported on the flange. An air intake pipe extending to the aerator is provided with horizontally extending support members to engage the top of the draft tube and support the aerator within the draft tube.

From the foregoing disclosure and the following more detailed description of various preferred embodiments it will be apparent to those skilled in the art that the present invention provides a significant advance in the technology of aerobic wastewater treatment systems. Particularly significant in this regard is the potential the invention affords for providing an easy to install, reliable, low maintenance, aerobic wastewater treatment system. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
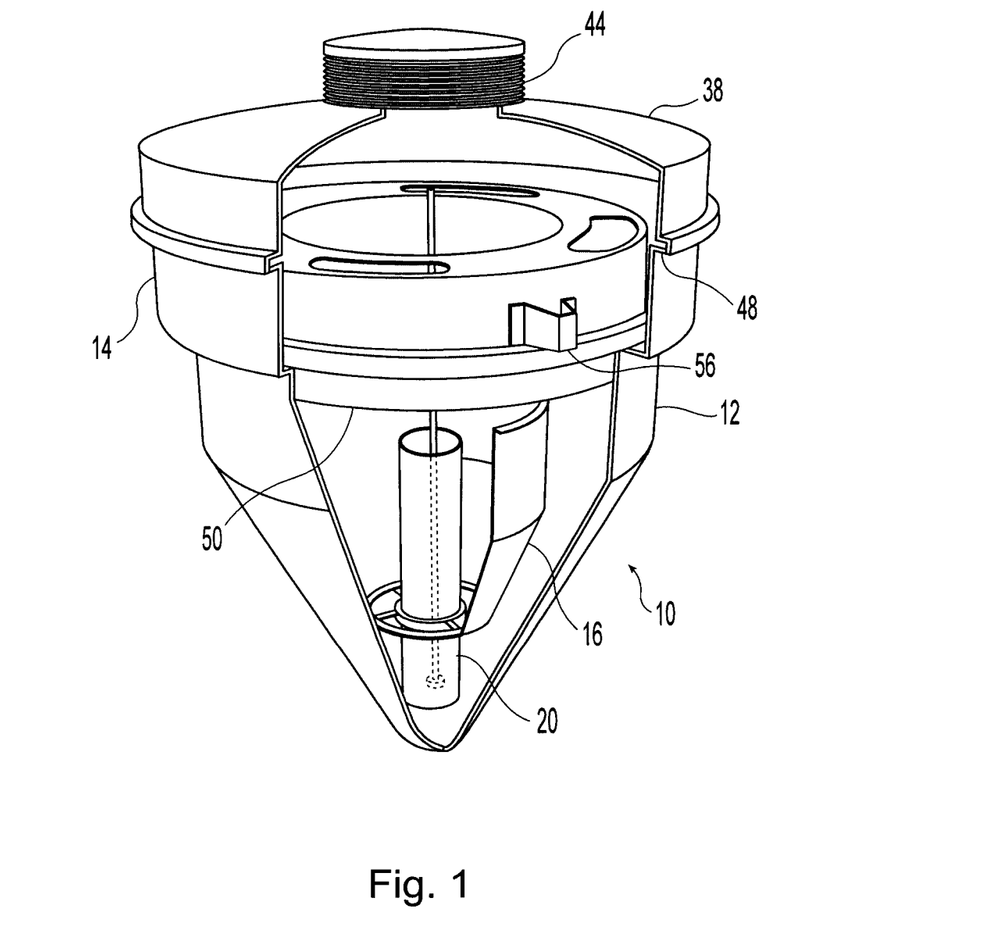
FIG. 1 is a perspective view of an aerobic wastewater treatment system according to a preferred embodiment of the present invention wherein portions of some components have been removed to show interior components.
Figure 2:
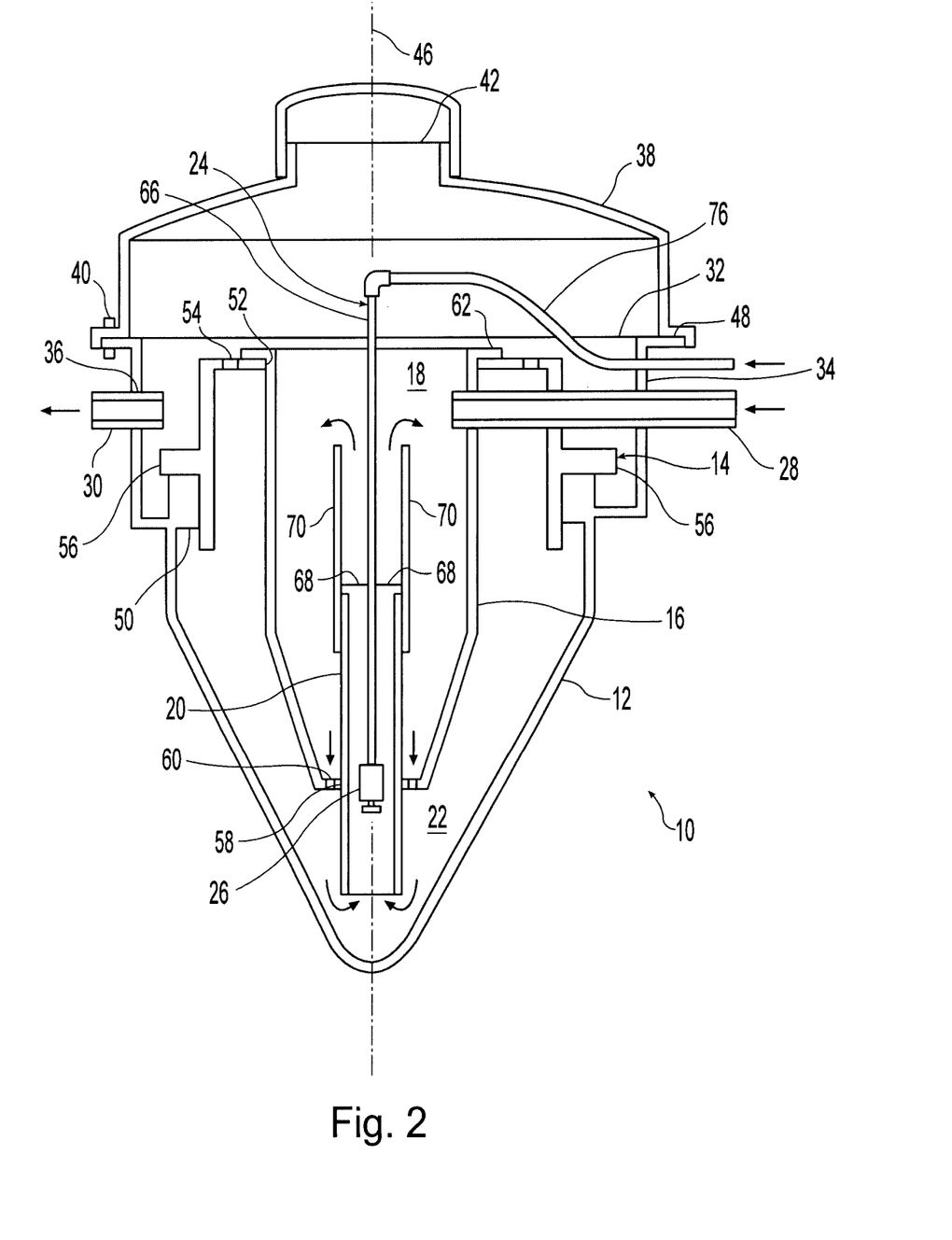
FIG. 2 is a diagrammatic view of the aerobic wastewater treatment system of FIG. 1.
Figure 3:
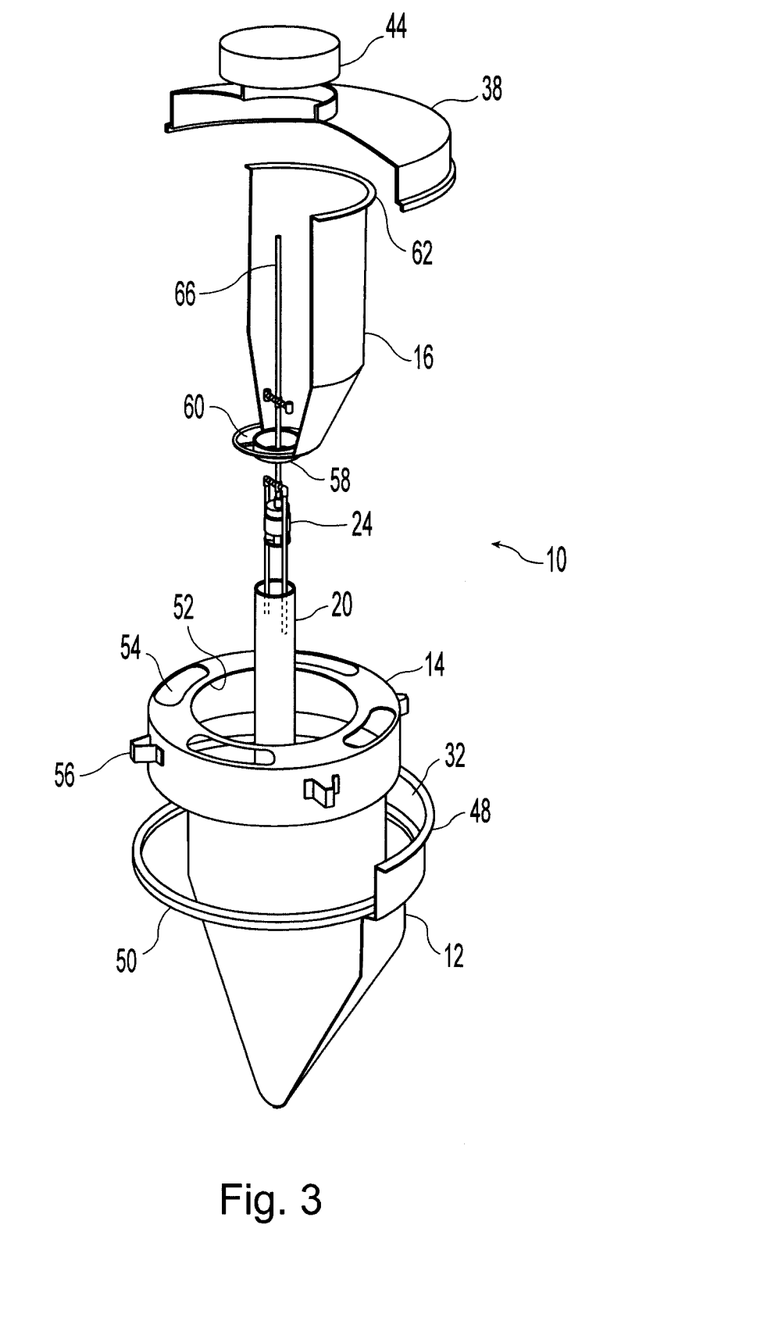
FIG. 3 is an exploded view of the aerobic wastewater treatment system of FIGS. 1 and 2 wherein portions of some components have been removed to show interior components.
Figure 4:
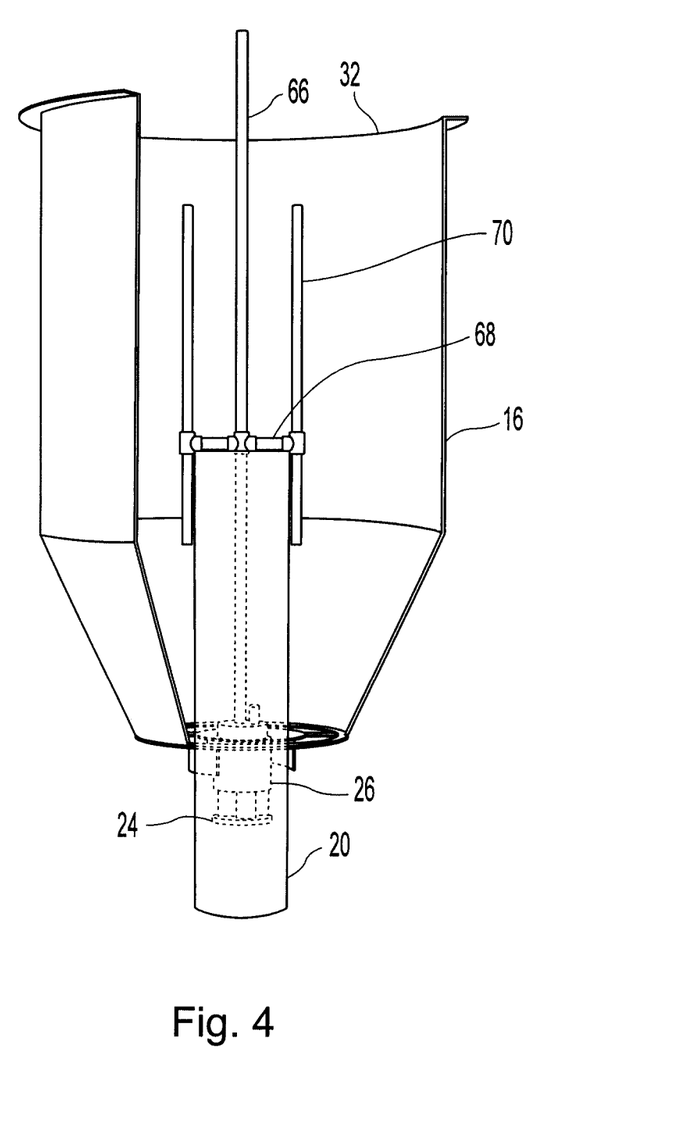
FIG. 4 is a perspective view of an aeration chamber of the aerobic wastewater treatment system of FIGS. 1 to 3 portions of some components have been removed to show interior components.
Figure 5:
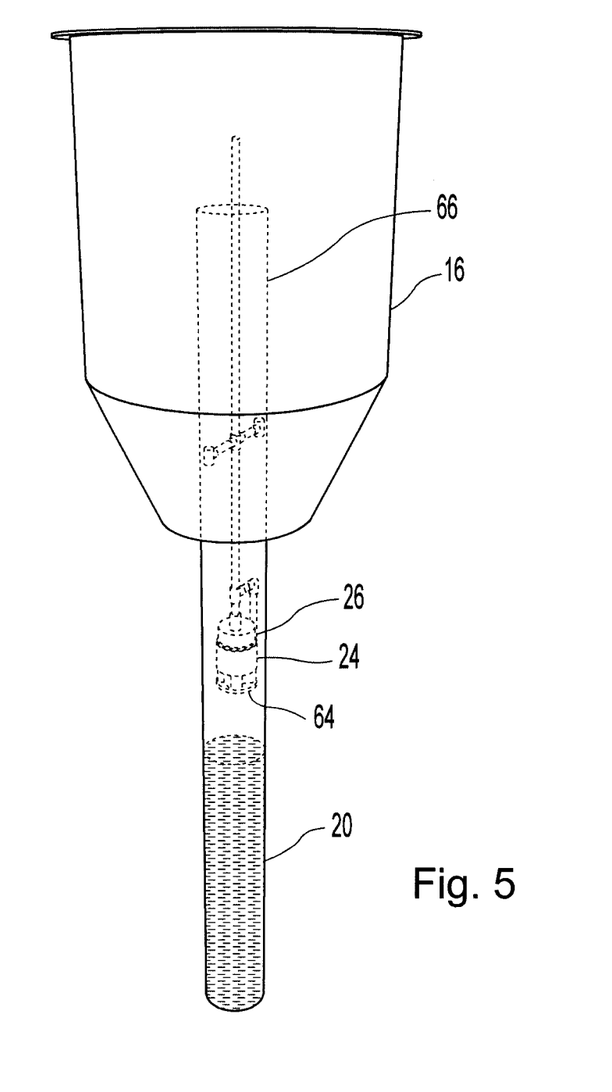
FIG. 5 is an exploded view of the aerobic wastewater treatment system of FIG. 4.

It should be understood that the appended drawings are not necessarily to scale, presenting a somewhat simplified representation of various preferred features illustrative of the basic principles of the invention. The specific design features of the wastewater treatment systems as disclosed herein, including, for example, specific dimensions, orientations, and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the wastewater treatment system illustrated in the drawings. In general, up or upward refers to an upward direction in FIG. 1 and down or downward refers to a downward direction in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the wastewater treatment systems disclosed herein. The following detailed discussion of various alternative and preferred embodiments will illustrate the general principles of the invention with reference to a wastewater treatment system a submerged aerator. Other embodiments suitable for other applications will be apparent to those skilled in the art given the benefit of this disclosure such as, for example, a wastewater treatment system having an external aerator.

Referring now to the drawings, FIGS. 1 to 5 illustrate an aerobic wastewater treatment system 10 according to a preferred embodiment of the present invention. The illustrated wastewater treatment system 10 includes an outer tank 12, a scum baffle 14 for preventing floating solids from exiting the outer tank 12, an inner tank or aeration chamber partition 16 located within the outer tank 12 and forming a central aeration chamber 18 therein, a draft tube 20 located within the outer tank 12 and vertically extending into the bottom of the aeration chamber 18 to communicate the aeration chamber 18 with an outer chamber 22 formed between the aeration chamber partition 16 and the outer tank 12, and an aerator assembly 24 including an aerator 26 located within the draft tube 20. Wastewater enters the system 10 by flowing into an influent pipe or inlet 28 which communicates the influent into the aeration chamber 18. Relatively clear effluent is discharged from the system 10 through an effluent pipe or outlet 30 which communicates the effluent out of the outer tank 12.

The illustrated outer or holding tank 12 forms a hollow interior and is closed except for an open upper end 32 and the inlet opening 34 and outlet opening 36. The illustrated tank 12 has a generally dome shaped cover 38 to close the open upper end 32. The illustrated cover 38 is sealed to the outer tank 12 with a seal or gasket and secured to the outer tank 12 with fasteners such as, for example, bolts and lock nuts or other suitable fasteners 40. The illustrated cover 38 has a centrally located access opening 42 therein with riser to selectively provide access in to the interior of the outer tank 12. A lid 44 removably mates to the access opening 42 in the cover 38 to selectively provide access to the interior of the outer tank 12. It is noted that the cover 38 can alternatively have any other suitable shape and/or can alter natively be secured to the outer tank 12 in any other suitable manner. The illustrated outer tank 12, the cover 38, and the lid 44 are each molded or formed as separate one-piece components. These components 12, 38, 44 preferably comprise a fiberglass reinforced plastic but any other suitable material can alternatively be utilized. Preferably, the fiberglass reinforced plastic has a flexural strength of about 36,350 PSI, a flexural modulus of about $1.49 \times 10^6$ PSI, a tensile strength of about 16,210 PSI, and a heat distortion temperature of about 183 degrees Fahrenheit.

The illustrated outer tank 12 has a vertically extending central axis 46 and is generally symmetrical about the central axis 46. The illustrated outer tank 12 is generally circular in cross-sections perpendicular to the central axis 46. The illustrated outer tank 12 includes a bottom portion which shaped like an inverted cone. The sloped bottom of the outer tank 12 acts as the claimer. The illustrated bottom portion is closed at is lower end and open at its upper end. A cylindrically-shaped intermediate portion extends upwardly from the top of the bottom portion to a horizontally and outwardly extending ledge or offset at the top of the intermediate portion. A cylindrically-shaped top portion extends upwardly from the top of the offset to a horizontally and outwardly extending flange 48 at the top of the top portion. The flange 48 is sized and shaped to cooperate with the cover 38 to close and seal the outer tank 12. It is noted that the outer tank 12 can alternatively have any other suitable size and shape.

An effluent weir 50 is provided that extends the entire circumference of the inside of the outer tank 12 near the offset and below the outlet opening 36. The illustrated weir 50 is formed integral with the outer tank 12. That is, the illustrated weir 50 is molded as part of a one-piece molded outer tank 12. It is noted that alternatively the weir 50 can be formed as a separate component and secured to the outer tank 12. The illustrated weir 50 is sized and shaped to receive the scum baffle 14 thereon as described in more detail hereinafter. It is noted that the weir 50 can be provided with any suitable size and shape.

The illustrated scum baffle 14 has a substantially cylindrical main wall. The lower end of the main wall is open. The upper end of the main wall is provided with a top wall having a central opening 52 sized and shaped for receiving the inner tank 12 therein as described in more detail herein after. The illustrated top wall is provided with a plurality of circumferentially-shaped apart openings or passages 54. A plurality of circumferentially-spaced-apart support brackets 56 outwardly extend from the outer side of the main wall. The illustrated scum baffle 14 has four support brackets 56 but any other suitable quantity can alternatively be utilized. The illustrated scum baffle 14 is sized and shaped to cooperate with the effluent weir 50 such that the main wall extends inside the weir 50 and the support brackets 56 rest on a ledge formed by the effluent weir 50. The illustrated scum baffle 14 is entirely supported by the effluent weir 50. It is noted that the scum baffle 14 simply rests on the effluent weir 50 and is not secured to the effluent weir 50 or any other structure with fasteners or the like. It is noted that the scum baffle 14 can alternatively be provided with any other suitable size and shape.

The illustrated scum baffle 14 is molded or formed as a separate one-piece component. The scum baffle 14 preferably comprises a fiberglass reinforced plastic but any other suitable material can alternatively be utilized. Preferably, the fiberglass reinforced plastic has a flexural strength of about 36,350 PSI, a flexural modulus of about $1.49 \times 10^6$ PSI, a tensile strength of about 16,210 PSI, and a heat distortion temperature of about 183 degrees Fahrenheit.

The illustrated inner tank or aeration chamber partition 16 has a vertical central axis 46 and is generally symmetrical about the central axis 46. The illustrated inner tank is generally circular in cross-sections perpendicular to the central axis 46. The illustrated inner tank 16 includes a bottom portion which shaped like a frustrated inverted cone. The illustrated bottom portion is open at its upper end and has a bottom wall at is lower end. The illustrated bottom wall has a central opening 58 sized and shaped for receiving the draft tube 20 therein as described in more detail herein after. The illustrated bottom wall is also provided with a plurality of circumferentially-shaped apart openings or passages 60 extending about the central opening 58. A cylindrically-shaped top portion extends upwardly from the top of the bottom portion to a horizontally and outwardly extending flange 62 at the top of the intermediate portion. The top portion and the flange 62 is sized and shaped to cooperate with the scum baffle 14 such that the main wall extends inside the central opening 52 of the scum baffle and the flange 62 rests on the top wall of the scum baffle 14. The illustrated inner tank 16 is entirely supported by the scum baffle 14. It is noted that the inner tank 16 simply rests on the scum baffle 14 and is not secured to the scum baffle 14 or any other structure with fasteners or the like. Supported in this manner, the inner tank 16 is coaxial with the outer tank 12 and forms the first or central aeration chamber 18 within the inner tank 12 which is in communication through the bottom wall of the inner tank 16 with the second or outer chamber 22 located between the inner and outer tanks 16, 12. It is noted that the inner tank 16 can alternatively have any other suitable size and shape.

The illustrated inner tank 16 is molded or formed as a separate one-piece component. The inner tank 16 preferably comprises a fiberglass reinforced plastic but any other suitable material can alternatively be utilized. Preferably, the fiberglass reinforced plastic has a flexural strength of about 36,350 PSI, a flexural modulus of about $1.49 \times 10^6$ PSI, a tensile strength of about 16,210 PSI, and a heat distortion temperature of about 183 degrees Fahrenheit.

The illustrated draft tube 20 is circular in cross-section and is substantially straight between open upper and lower ends. The illustrated draft tube 20 vertically extends through the central opening 58 in the bottom wall of the inner tank 16 so that the upper end is located in the first chamber 18 within the inner tank 16 and the lower open end is located in the second chamber 22 outside the inner tank 16. The illustrated draft tube 20 is entirely supported by the inner tank 16 and can be secured to the inner tank 16 in any suitable manner.

Figure 6:
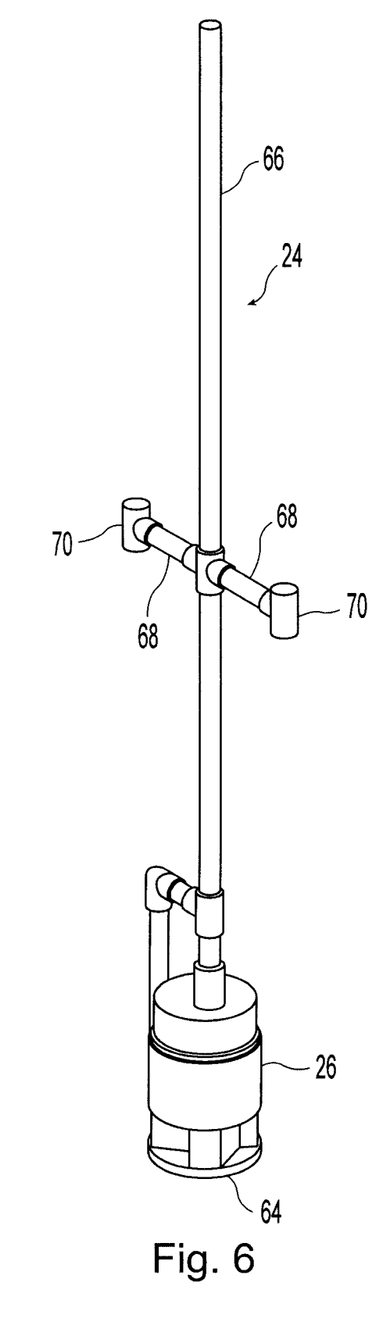
FIG. 6 is an enlarged perspective view of an aerator assembly of the aerobic wastewater treatment system of FIGS. 1 to 5.
Figure 7:
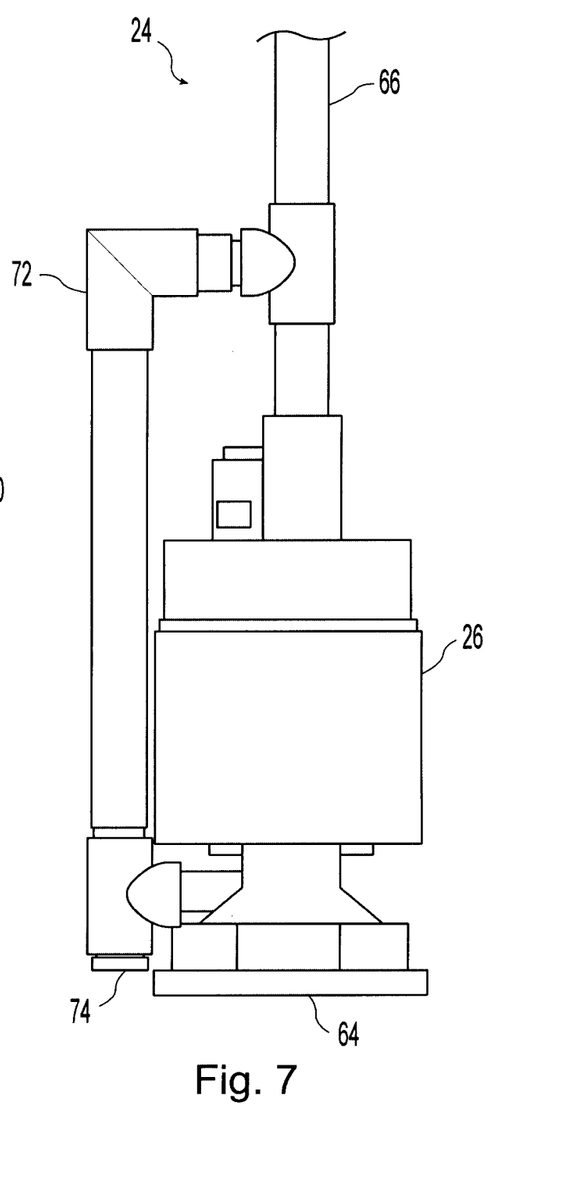
FIG. 7 is an enlarged perspective view of a portion of the aerator assembly of FIG. 6.

The as best shown in FIGS. 6 and 7, the illustrated aerator assembly 24 includes the aerator 26 with an impeller 64 at its lower end and an air intake pipe 66 vertically extending from the top of the aerator 26 and in communication with the aerator 26 to supply air to the aerator 26 from a source of air located outside the outer tank 12. The aerator 26 can be any suitable aerator such as, for example, Aerator #A10031 available from Consolidated Treatment Systems, Inc. which is cast iron and stainless steel, has a 1/6 HP, 1550 RMP motor with thermal overload protection, 120 volts AC, 1.8 amps, and 60 HZ. This aerator has a 3.6 lbs/day oxygen transfer rate, will aerate and metabolize 1.5 lbs BOD and, provides 100-200 CFH air delivery. The illustrated air intake pipe 66 is provided with a pair of aerator supports 68 that perpendicularly extend from opposed sides of the air intake pipe 66 a distance above the aerator 26 that defines the position of the aerator 26 within the draft tube 20 when engaging the top of the draft tube 20 as describe in more detail hereinafter. The illustrated air intake pipe 66 is also provided with a pair of aerator locaters 70 that vertically extend in both upward and downward directions from outer ends of the aerator supports 68. The aerator locators 70 are substantially parallel and spaced apart from the air intake pipe 66 and are spaced apart a distance such that they are located outside the draft tube 20 and closely adjacent the outside surface of the draft tube 20 to centrally locate the aerator 26 within the draft tube 20. The aerator locators 70 extend downardly from the aerator supports 68 a distance adequate to stabilize the aerator assembly 24 on the draft tube 20 and preferably extend upwardly a distance adequate to assist in removing the aerator assembly 24 out of the of the outer tank 12 through the central access opening 42 for maintenance and repair. The illustrated air intake pipe 66 further includes a lifting support 72 which connects a portion of the air intake pipe 66 located above the aerator 26 with a bottom portion of the aerator 26 above the impeller 64. The illustrated lifting support 72 is provided with an air intake clean-out 74. The illustrated air intake pipe 66, aerator supports 68, aerator locators 70, and lifting support 72 are each formed by similar pipe components (pipes and fittings). It is noted that the pipe components can comprise PVC or any other suitable material.

The illustrated aerator assembly 24 rests on the top of the draft tube 20. The illustrated aerator assembly 24 is entirely supported by the draft tube 20. It is noted that the aerator assembly 24 simply rests on the top of the draft tube 20 and is not secured to the draft tube 20 or any other structure with fasteners or the like. Supported in this manner, the aerator assembly 24 can be easily raised and lowered into and out of position through the access opening 42 of the outer tank 12. The upper end of the air inlet pipe 66 is connected to an air inlet tube or hose 76 which extends through the side of the outer tank 12 to the air supply. Suitable electrical control lines also extend to the aerator 26 in this manner.

Installed in this manner the aerator 26 is submerged in the wastewater and is operated to continuously lift and stir organic material mix and to oxygenate the wastewater. Mixing and aeration facilitate and maintain the growth of microbes that perform the wastewater treatment. The illustrated aerator 26 lifts organic mix from the second chamber 22 through the draw tube 20 to the first chamber 18. The aerator 28 draws air into the system through the air intake pipe 66. A vent pipe can communicate the outer tank 12 with external air if desired.

The influent pipe 28 and an effluent pipe 30 are located so that the system 10 continuously holds a constant volume of wastewater. Wastewater enters through the influent pipe 28 to the central aeration chamber 18 within the inner tank 16 where it is mixed by the aerator 26. The illustrated influent pipe 28 horizontally extends through the side of the outer tank 12, the scum baffle 14, and the inner tank 16. As a volume of wastewater enters through the influent pipe 28, an equal volume of water is displaced and passes through the passages in the scum baffle 14, over the weir 50, and out through the effluent pipe 30. The illustrated effluent pipe 30 horizontally extends through the side of the outer tank 12 at generally the same height as the influent pipe 28. It is noted that the effluent pipe 30 can alternatively be located lower than the influent pipe 28 if desired.

To install the system 10, the outer tank 12 is first installed in an excavation. The outer tank 12 should be level. The out tank 12 is then back filled until the bottom cone is completely covered. The fill material is compacted evenly around the outer tank 12 to prevent uneven settling after backfilling is completed. If the outlet opening 36 is not present for the discharge or effluent pipe 30, the outlet opening 36 is cut using a hole saw where desired and a seal is placed in the opening 36. Care must be taken not to scar or damage the interior weir 50 during this process. Next the scum baffle 14 is lowered into the outer tank 12 until the support brackets 56 rest on top of the weir 50. Once resting on the weir 50, the scum baffle 14 is rotated if needed to align the inlet opening in the scum baffle 14 with the inlet opening 34 in the outer tank 12. The inner tank 16 is then lowered, with the draft tube 20 attached, into the scum baffle 14 until the inner tank flange 62 rests on the scum baffle 14. Once resting on the scum baffle 14, the inner tank 16 is rotated if needed to align the inlet opening in the inner tank 16 with the inlet openings in the scum baffle and the outer tank 34. The influent pipe 28 is then inserted through the inlet openings 34 in the outer tank 12, the scum baffle 14, and the inner tank 16. The cover 38 is then sealed and secured to the outer tank 12 with the bolts and lock nuts 40. Once the cover 38 is secured, the access lid 44 is removed and the aerator assembly 24 is lowered into the draft tube 20 until it rests on the top of the draft tube 20. If a diffuser is used in place of the aerator, this step is omitted. The air line 76 is inserted through a hole in the outer tank 12 and secured to the top of the aerator air intake pipe 66 or the diffuser. Next the effluent pipe 30 is inserted into the outlet opening 36, the aerator air line 76 and electrical lines are connected to an air source and an electrical source respectively, and the influent and effluent pipes 28, 30 are connected as desired outside the outer tank 12. Finally, the backfill is completed until the outer tank 12 is covered except for the access opening.

From the foregoing disclosure, it can readily be seen that the aerobic wastewater treatment system 10 according to the present invention provides an improved system which is relatively easy to ship and install. For example, the outer tank 12, scum baffle 14, and inner tank 16 nest for shipment and installation and require no fastening hardware. Additionally, the improved system which is relatively easy to maintain and repair. For example, the aerator assembly 24 can be raised and lowered through the access opening 42 without removing and installing fasteners and without pumping the tanks 12, 16.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An aerobic wastewater treatment system comprising, in combination:
    an outer tank;
    an aeration chamber partition located within the outer tank and forming an aeration chamber therein;
    a draft tube located within the outer tank and vertically extending into the bottom of the aeration chamber to communicate the aeration chamber with an outer chamber formed between the aeration chamber partition and the outer tank;
    an aerator located within the draft tube;
    an inlet for communicating influent into the aeration chamber;
    an outlet for communicating effluent out of the outer tank;
    a scum baffle for preventing floating solids from exiting the outlet; and
    wherein the outer tank has an upward facing ledge and the scum baffle is supported on the ledge.

2. The aerobic wastewater treatment system according to claim 1, wherein the scum baffle is not attached to the outer tank with fasteners.

3. The aerobic wastewater treatment system according to claim 1, wherein the scum baffle has an upward facing flange and the aeration chamber partition is supported on the flange.

4. The aerobic wastewater treatment system according to claim 3, wherein the aeration chamber partition is not attached to the scum baffle with fasteners.

5. The aerobic wastewater treatment system according to claim 1, wherein the aerator is supported on the draft tube.

6. The aerobic wastewater treatment system according to claim 5, wherein the aerator is not attached to the draft tube with fasteners.

7. The aerobic wastewater treatment system according to claim 5, wherein an air intake pipe extends to the aerator through the top of the draft tube.

8. The aerobic wastewater treatment system according to claim 7, wherein the air intake pipe is provided with horizontally extending support members to engage the top of the draft tube and support the aerator within the draft tube.

9. The aerobic wastewater treatment system according to claim 8, wherein the support members of the air intake pipe is provided with vertically extending locators outside the draft tube for centering the air intake pipe within the draft tube.

10. An aerobic wastewater treatment system comprising, in combination:
    an outer tank;
    an aeration chamber partition located within the outer tank and forming an aeration chamber therein;
    a draft tube located within the outer tank and vertically extending into the bottom of the aeration chamber to communicate the aeration chamber with an outer chamber formed between the aeration chamber partition and the outer tank;
    an aerator located within the draft tube;
    an inlet for communicating influent into the aeration chamber;
    an outlet for communicating effluent out of the outer tank;
    a scum baffle for preventing floating solids from exiting the outlet; and
    wherein the tank includes an effluent weir that forms the upward facing ledge which supports the scum baffle.

11. The aerobic wastewater treatment system according to claim 1, wherein the outer tank, the scum baffle, and the aeration chamber partition are each generally circular about a central vertical axis.

12. An aerobic wastewater treatment system comprising, in combination:
    an outer tank;
    an aeration chamber partition located within the outer tank and forming an aeration chamber therein;
    a draft tube located within the outer tank and vertically extending into the bottom of the aeration chamber to communicate the aeration chamber with an outer chamber formed between the aeration chamber partition and the outer tank;
    an aerator located within the draft tube;
    an inlet for communicating influent into the aeration chamber;
    an outlet for communicating effluent out of the outer tank;
    wherein the aerator is supported on the draft tube;
    wherein an air intake pipe extends to the aerator through the top of the draft tube; and
    wherein the air intake pipe is provided with horizontally extending support members to engage the top of the draft tube and support the aerator within the draft tube.

13. The aerobic wastewater treatment system according to claim 12, wherein the aerator is not attached to the draft tube with fasteners.

14. The aerobic wastewater treatment system according to claim 12, wherein the support members of the air intake pipe is provided with vertically extending locators outside the draft tube for centering the air intake pipe within the draft tube.

15. An aerobic wastewater treatment system comprising, in combination:
an outer tank;
an aeration chamber partition located within the outer tank and forming an aeration chamber therein;
a draft tube located within the outer tank and vertically extending into the bottom of the aeration chamber to communicate the aeration chamber with an outer chamber formed between the aeration chamber partition and the outer tank;
an aerator located within the draft tube;
an inlet for communicating influent into the aeration chamber;
an outlet for communicating effluent out of the outer tank;
wherein the aerator is supported on the draft tube; and
wherein an air intake pipe is provided with a lifting support so that the aerator can be lifted out through the top of the draft tube by raising the air intake pipe.

16. The aerobic wastewater treatment system according to claim 12, wherein the outer tank, the scum baffle, and the aeration chamber partition are each generally circular about a central vertical axis.

17. An aerobic wastewater treatment system comprising, in combination:
an outer tank;
an aeration chamber partition located within the outer tank and forming an aeration chamber therein;
a draft tube located within the outer tank and vertically extending into the bottom of the aeration chamber to communicate the aeration chamber with an outer chamber formed between the aeration chamber partition and the outer tank;
an aerator located within the draft tube;
an inlet for communicating influent into the aeration chamber;
an outlet for communicating effluent out of the outer tank; and
a scum baffle for preventing floating solids from entering the outlet;
wherein the outer tank has an effluent weir and the scum baffle is supported on the effluent weir;
wherein the scum baffle has an upward facing flange and the aeration chamber partition is supported on the flange; and
wherein an air intake pipe extending to the aerator through an upper end of the draft tube is provided with horizontally extending support members to engage a top of the draft tube and support the aerator within the draft tube.

18. An aerobic wastewater treatment system comprising, in combination:
an outer tank;
an aeration chamber partition located within the outer tank and forming an aeration chamber therein;
a draft tube located within the outer tank and vertically extending into the bottom of the aeration chamber to communicate the aeration chamber with an outer chamber formed between the aeration chamber partition and the outer tank;
an aerator located within the draft tube;
an inlet for communicating influent into the aeration chamber;
an outlet for communicating effluent out of the outer tank;
a scum baffle for preventing floating solids from exiting the outlet; and
wherein the scum baffle has an upward facing flange and the aeration chamber partition is supported on the flange.

19. The aerobic wastewater treatment system according to claim 18, wherein the aeration chamber partition is not attached to the scum baffle with fasteners.

* * * * *